No. 648,770. Patented May 1, 1900.
W. MILLER.
SUN DIAL.
(Application filed Mar. 11, 1898.)
(No Model.)

Witnesses  William Miller, Inventor.
By his Attorneys,

THE NORRIS PETERS CO., PHOTO-LITHO., WASHINGTON, D. C.

UNITED STATES PATENT OFFICE.

WILLIAM MILLER, OF FORT WAYNE, INDIANA.

SUN-DIAL.

SPECIFICATION forming part of Letters Patent No. 648,770, dated May 1, 1900.

Application filed March 11, 1898. Serial No. 673,498. (No model.)

*To all whom it may concern:*

Be it known that I, WILLIAM MILLER, a citizen of the United States, residing at Fort Wayne, in the county of Allen and State of Indiana, have invented a new and useful Sun-Dial, of which the following is a specification.

This invention relates to sun-dials, and has for its object to provide a construction comprising the minimum number of parts, the movable parts thereof being housed within the body or casing of the device and accessible therethrough for adjustment to accommodate the instrument to the required time of the year.

Further objects and advantages of this invention will appear in the following description, and the novel features thereof will be particularly pointed out in the appended claim.

Figure 1:
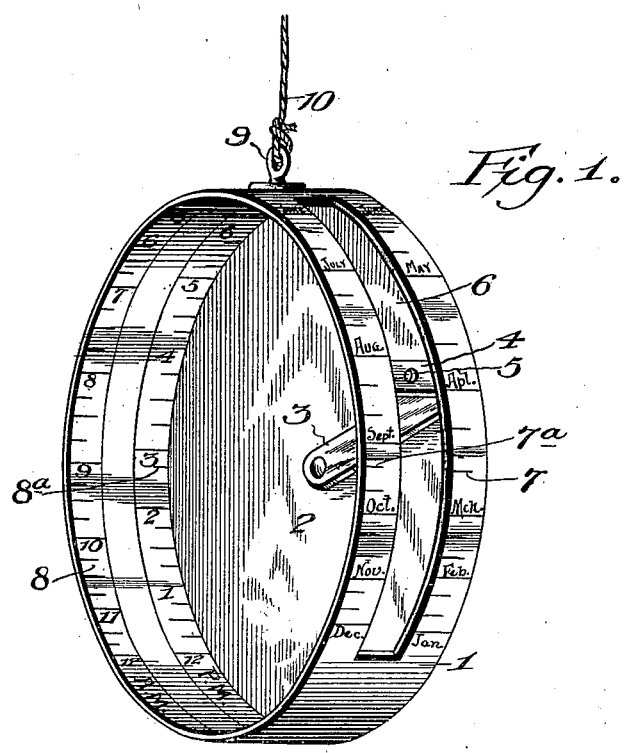
Figure 2:
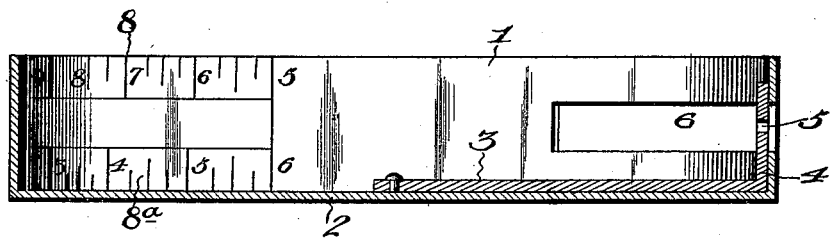

In the drawings, Figure 1 is a perspective view of a sun-dial constructed in accordance with my invention. Fig. 2 is a transverse section of the same.

Similar numerals of reference indicate corresponding parts in both figures of the drawings.

The body portion of the apparatus embodying my invention consists of a cup having a substantially-cylindrical wall 1, closed at one side by a disk 2, to the center of the inner side of which is pivoted an adjustable arm 3, having an upturned terminal extension 4 to traverse and bear against the inner surface of the wall or ring and having a perforation 5 to admit a sunbeam to the interior of the cup, said perforation being in registration with a slot 6, formed in the ring.

Arranged upon the exterior of the wall, on each side of the slot 6, are month-scales 7 and 7ª, bearing the names of the months of the year or other characters representing the same arranged consecutively, the progression at one side of the slot, including a series of month characters from January to June, being arranged in the inverse order of the progression at the other side of the slot and including the month characters from July to December.

The intervals between the month characters in the scale 7 are greater than those between the characters in the scale 7ª, and the number of intervals or spaces is less, only five spaces being indicated in the scale 7, while six are formed in the scale 7ª in order to suit the relative declinations of the sun at different times in the year, and each main space of each scale is subdivided to represent fractions of a month, and thus facilitate the accurate adjustment of the arm 3, which carries the solar-ray perforation. Furthermore, the inner surface of the wall diametrically opposite to the slot 6 is graduated to represent hours, said graduations being arranged in parallel scales 8 and 8ª, the former representing the hours from five to twelve a. m. and the latter representing the hours from twelve to six p. m. The casing may be provided adjacent the upper end of the slot 6 with any suitable suspending device, such as a swivel 9, to which may be attached a cord 10 or its equivalent.

In operation the adjustable arm is arranged with the solar-ray perforation opposite the point of the month-scale corresponding with the time of the year and month, and holding the casing by its suspending device it is turned to arrange the solar-ray perforation toward the sun, and a ray of sunlight passing through said perforation and striking upon the hour-scale will indicate the time of day.

It will be understood that an essential feature of the construction embodying my invention is the simplicity thereof from the fact that the only movable part is the elbowed pivotal arm 3, of which the upturned extremity 4 traverses and bears against the inner surface of the ring 1 and is arranged within, and hence protected by, the casing. The disk 2, formed with the rim or annular wall 1, permanently closes one side of the casing, and having a plane surface it may be suitably inscribed or stamped with advertising matter without interfering with the operation or functions of the apparatus. The radial arm 3 is pivoted to the disk 2, concentric with the annular wall or rim 1, and bears frictionally thereagainst throughout its length, so as to retain the arm in an adjusted position. The casing is so constructed that there are no necessary projections beyond the exterior surface thereof other than the suspending device.

The simplicity of the device embodying my invention will be obvious from the fact that it comprises only two parts—namely, the ring or band and the arm—and of said parts only the arm is movable, and while the movable member of the device is concealed and protected within the casing the upturned outer extremity 4 thereof, which is provided with the solar-ray perforation, is accessible through the slot to facilitate adjustment to suit the portion of the year in which the observation is taken. The simplicity of the device and the fact that it includes no loose or displaceable part adapts it particularly for use as a watch-charm or other ornament and otherwise renders it durable.

Having described my invention, what I claim is—

In a sun-dial, the combination, with a cup, the wall of which is substantially cylindrical and one portion thereof is provided with a segmental slot, the exterior surface of the wall upon each side of the slot being provided with characters to indicate the months of the year and the interior surface of the wall diametrically opposite to said slot being imperforate and provided with parallel rows of characters to indicate the hours, of an arm pivotally secured in the center of the cup, the free end of which is bent at an angle to the main portion and lies adjacent to the interior of the slotted portion of the wall and is provided with a perforation to register with said slot, and means upon the wall adjacent to one end of the slot for suspending said cup in a vertical position.

In testimony that I claim the foregoing as my own I have hereto affixed my signature in the presence of two witnesses.

WILLIAM MILLER.

Witnesses:
JOHN T. SURMAN,
LOUIS C. BURKAS.